Patented Mar. 10, 1942

2,276,175

UNITED STATES PATENT OFFICE 2,276,175

PHTHALOCYANINE PIGMENT

Maurice H. Fleysher and James Ogilvie, Buffalo, N. Y., assignors to Allied Chemical & Dye Corporation, a corporation of New York No Drawing. Application April 7, 1939, Serial No. 266,538

10 Claims. (Cl. 260—314)

This invention relates to improvements in phthalocyanine pigments and particularly in copper phthalocyanine pigments. It relates to an improved process for the treatment of the said pigments so as substantially to improve their properties, particularly for use in admixture with drying oils, as in printing inks, lithograph inks, paints, lacquers, enamels, and varnishes; and to the resulting improved pigments.

The phthalocyanines, and particularly copper phthalocyanine, are dyestuffs and pigments which have the very advantageous properties of imparting shades that are characterized by excellent fastness to light, great color strength, and brilliance.

However, in the use of these products there are certain important difficulties which heretofore have not been successfully overcome. One of these is the tendency of the phthalocyanine pigments, and particularly copper phthalocyanine pigments, when incorporated in oil paints and inks, to inhibit the drying of the oils. As a result, when the said pigments are used in printing or lithographic inks, the drying of the lithographic varnish is seriously retarded or prevented; so that prints made with such inks are slow to dry or do not dry at all and remain tacky and are apt to rub off or smear and to offset or transfer from the printed sheet to the contacting surface of another sheet. In some cases this inhibition of drying of the ink vehicle causes other objectionable effects, such as "striking through" (penetration of the oil to the reverse side of the paper), and "greasiness" (oily halos around the prints).

In addition to this drying inhibiting property, it has been found that when phthalocyanine pigments which have been prepared in finely divided form by the usual acid pasting processes are employed as constituents of paints and printing inks, coating films and prints of such paints and inks show a marked tendency to become dull and bronzy on drying, particularly when the paints and inks contain zinc oxide, barium sulfate and similar substrata. This bronzing effect is very undesirable.

According to the present invention it has been found that these undesirable properties can be removed from the phthalocyanine pigments by subjecting them to a mild oxidation treatment under non-acid conditions. Thus, it has been found in accordance with the present invention that phthalocyanine pigments, and especially acid-pasted copper phthalocyanine pigments, which are free from said bronzing and from drying inhibiting effects can be obtained by treating said pigments with neutral or alkaline oxidizing agents in small amounts under mild oxidizing conditions. An especially effective alkaline oxidizing agent for acid-pasted copper phthalocyanine pigments is a dilute aqueous solution of sodium hypochlorite. This is surprising inasmuch as the phthalocyanines are attacked by strong alkali-metal hypochlorites forming conversion products soluble in alcohol, acetone and oils and resulting in phthalocyanine products of greener and duller shades which are unsuitable for the usual technical purposes.

In general, the mild oxidation treatment does not adversely affect the brilliancy and fastness properties of the phthalocyanine pigments. Sometimes, however, the phthalocyanine pigments, especially copper phthalocyanine pigments, which have been subjected to the mild non-acid oxidation treatment exhibit a tendency, when incorporated in lacquers or printing inks, to produce somewhat dull, flat and/or greenish shades on drying. This tendency is especially pronounced when the pigment lacquers or printing inks are applied to metallic surfaces, particularly of aluminum or brass.

It has been found, according to a further feature of the present invention, that the said undesirable tendency can be eliminated by giving the phthalocyanine pigment, after it has undergone the mild non-acid oxidizing treatment, a further treatment under mild reducing conditions with a mild reducing agent which is capable of reacting with the previously applied oxidizing agent to form water soluble reaction products. The pigment is thereby rendered slightly redder and more brilliant; and lacquers and printing inks in which pigments so treated are incorporated retain their brilliance on drying, and likewise have no tendency to bronze or to remain tacky. Alkali-metal bisulfites are particularly suitable mild reducing agents for the treatment of copper phthalocyanine pigments which have been treated previously with alkali-metal hypochlorites. Thus, it has been found in accordance with the present invention, when a copper phthalocyanine pigment which has been treated with sodium hypochlorite in the manner hereindescribed is subsequently treated with a dilute solution of sodium bisulfite, its shade remains reddish and brilliant even when applied in the form of a lacquer or printing composition to metallic surfaces. At the same time, the advantages resulting from the hypochlorite treatment are fully retained.

In the practice of the present invention in accordance with one method of procedure, a phthalocyanine pigment, preferably in a finely divided condition such as is obtainable by subjecting the pigment to an acid pasting procedure, is treated with a neutral or alkaline oxidizing agent under conditions sufficiently mild to avoid substantial attack of the phthalocyanine. Such conditions ordinarily include the use of the oxidizing agent in a dilute condition and in small amounts relative to the amount of pigment, e. g., a few percent by weight, and to the use of moderate temperatures.

In carrying out the reduction step, when employed, the reducing agent is used under conditions which result in mild reducing action. Such conditions ordinarily include the use of the reducing agent in a dilute condition and in small amounts relative to the amount of pigment, e. g., a few percent by weight, and to the use of moderate temperatures.

The following example illustrates the present invention. The parts are by weight.

Example 1, Part 1.—350 parts of copper phthalocyanine (produced, for instance, by condensing phthalonitrile with cuprous chloride) are dissolved in 3500 parts of 95% sulfuric acid at a temperature between 5° C. and 10° C. The mixture is cooled during the dissolution in order to maintain the temperature below 10° C. The resulting solution is drowned in 20,000 parts of cold water and the slurry is diluted with a further quantity of 20,000 parts of water. The suspension which results is filtered, and the filter cake is washed with water until free of acid.

The copper phthalocyanine press cake (about 1950 parts) is suspended in 13,000 parts of water and the slurry is heated to about 60° C. Then 65 parts of a 10 per cent sodium hypochlorite solution (which has been prepared by dissolving 125 parts of sodium hydroxide in 775 parts of water, and passing in 100 parts of chlorine while cooling to maintain the temperature between 0° C. and 5° C.) are added slowly. After agitating at about 60° C. for 1 hour, the temperature is raised to about 80° C. in order to decompose the excess sodium hypochlorite. The slurry is then filtered; the filter cake is washed thoroughly with hot water, and sucked dry.

Part 2.—A water paste may be prepared from the press cake of the treated pigment by addition of a small quantity of dispersing agent (e. g., 0.05 per cent to 2 per cent of Leukanol), and standardization of the paste to the desired strength in the usual manner. The pigment may be prepared in powder form by drying the press cake in enamel pans at 90° to 100° C., with or without the addition of dispersing agents, protective agents, etc., and grinding to the desired degree of fineness.

The pigment is substantially unaltered in shade as a result of the hypochlorite treatment. When used with lithographic varnish in printing inks, it does not retard or prevent drying of the varnish. It yields paints and printing inks which do not become bronzy on drying, even when used in admixture with zinc oxide or barium sulfate.

Example 2.—The product of Example 1, Part 1, while still in the filter as filter cake, is treated by circulating approximately 20,000 parts of aqueous sodium bisulfite solution of about 1 per cent concentration through the cake in the filter. The pigment is then washed with hot water until substantially free of salts, and again sucked dry. The resulting pigment is specially suited for coloring metallic surfaces. It may be further treated to convert it to a dry powder in any convenient manner; as for example in the manner set out in Example 1, Part 2.

It will be realized by those skilled in the art that the invention is not limited to the details of the foregoing examples and that changes may be made without departing from the scope of the invention.

Thus, the invention is not limited to the use of sodium hypochlorite as the oxidizing agent, since other oxidizing agents can be used under non-acid conditions; as for example, neutral oxidizing agents and alkaline oxidizing agents. As neutral oxidizing agents there may be mentioned hydrogen peroxide, potassium persulfate, alkali-metal nitrites and alkali-metal permanganates. As alkaline oxidizing agents there may be mentioned sodium peroxide, alkaline solutions of hydrogen peroxide, alkali-metal and alkaline earth metal hypochlorites or other hypohalites. While the neutral oxidizing agents improve the oil drying properties of the pigments and eliminate bronzing, the pigments treated with such neutral oxidizing agents are not as brilliant in paint films and prints as the pigments which have been treated with alkaline oxidizing agents. Hence, for the treatment of pigments which are to be used in the making of paints, printing inks and the like, alkaline oxidizing agents are preferred.

In carrying out the oxidation treatment, the oxidizing agent is employed under conditions resulting in only a mild oxidizing action. In order to secure such conditions, the pigment is preferably slurried or suspended in a large amount of water and the slurry is treated with a small amount of the oxidizing agent. In effect this is a treatment with a highly dilute solution of the oxidizing agent. Preferably the oxidation treatment is carried out at temperatures above ordinary atmospheric temperature, e. g., above 25° C., in order to accelerate the treatment; but high temperatures are avoided in order to maintain mild oxidizing conditions and, when employing hypohalites, to avoid their decomposition.

Thus, in carrying out the process described in the foregoing examples, the pigment may be suspended in from about 20 to about 50 parts of water for each part by weight of dry pigment, and an amount of hypochlorite solution may be employed such that a few per cent of sodium hypochlorite are present, based on the weight of the pigment (e. g., 1 to 2 parts of sodium hypochlorite per 100 parts by weight of pigment). This results in the sodium hypochlorite being present in the form of dilute aqueous solutions containing 2 to 10 parts of sodium hypochlorite per 10,000 parts of solution by weight (0.02 to 0.10 per cent concentration). The other oxidizing agents may be employed in equivalent quantities.

In carrying out the process of the foregoing Example 1, the temperature of the oxidizing treatment bath is preferably maintained above 50° C., and, in order to avoid the rapid decomposition of the sodium hypochlorite solutions by excessive heat, the temperature is preferably maintained below 80° C., a treatment for about 1 hour at 60° C. ordinarily being sufficient. With more stable oxidizing agents, for example potassium persulfate, higher temperatures may be employed; e. g., 100° C.

In carrying out the reducing treatment, the mildly oxidized pigment may be treated with the reducing agent in any convenient manner; e. g., by slurrying or suspending it in an aqueous solution of the reducing agent. A simple and effective procedure is to circulate the reducing solution through the filter in which the pigment is held as a press cake resulting from filtration of the mildly oxidized pigment.

Thus the press cake of pigment obtained after the mild oxidation treatment may be washed with an aqueous solution of sodium bisulfite in such an amount that from about 2 to about 100 parts by weight of sodium bisulfite are employed per 100 parts by weight of dry pigment, the concentration of the sodium bisulfite solution not exceeding 1 per cent by weight, and preferably being from about 0.1 per cent to about 1 per cent by weight. The total quantity of solution employed is preferably not less than 15 parts by weight per part of dry pigment. The treatment is preferably applied at ordinary atmospheric temperatures, e. g., from 10° C. to 30° C. Higher temperatures are avoided in order to limit the reaction to the reduction of easily reducible substances.

The invention is not limited to the use of sodium bisulfite as the reducing agent in the mild reduction step. Equivalent amounts of other mild reducing agents which react with the previously applied oxidizing agent to form water-soluble products, but which are not sufficiently reactive to attack the phthalocyanine molecule under the conditions of treatment, may be used. Suitable reducing agents are, for instance, alkali-metal arsenites, ferrocyanides, neutral sulfites, etc.

The invention further is not limited to the treatment of specific phthalocyanine pigments nor to the treatment of pigments produced by any special procedure. Thus, various phthalocyanine pigments may be treated in accordance with the invention; as for example, highly brominated and highly chlorinated phthalocyanines, which are generally green pigments. The process of the present invention is especially applicable to the treatment of copper phthalocyanine pigments.

The pigment is treated in a finely divided form, and preferably in the form resulting from acid pasting. The acid pasting of the pigment may be carried out in the manner known to those skilled in the manufacture of insoluble pigments and dyes, such as vat dyes. Thus, sulfuric acid or other acids disclosed in the prior art, may be used; as for example, chlorsulfonic acid, phosphoric acid, ethyl sulfuric acid, and trichloracetic acid. In carrying out the acid pasting operation of the foregoing examples, the copper phthalocyanine pigment may be dissolved in about 5 to about 10 times its weight of concentrated sulfuric acid (which is preferably of a concentration between about 90 and 100 per cent $H_2SO_4$) while maintaining the temperature of the mixture not higher than 30° C. and preferably between 5° and 10° C. In drowning the resulting solution, an amount of water from about 6 to about 10 times the weight of the sulfuric acid solution may be used, and the water may be cold or hot. For ordinary pigments, water at a temperature of about 10° to 30° C. may be used for drowning the solution. For the production of a more finely divided pigment particularly adapted for the manufacture of powders, it is desirable, however, to preheat the water to about 80° C. or higher before adding the sulfuric acid solution thereto.

We claim:
1. A process of improving an acid pasted copper phthalocyanine pigment which comprises subjecting said acid pasted pigment to a mild oxidation treatment with a dilute aqueous solution of an inorganic oxidizing agent under non-acid conditions.

2. A process of improving an acid pasted copper phthalocyanine pigment which comprises subjecting said acid pasted pigment to the oxidizing action of a dilute aqueous solution of an alkaline inorganic oxidizing agent under mild oxidizing conditions.

3. A process of improving an acid pasted copper phthalocyanine pigment which comprises subjecting said acid pasted pigment to the oxidizing action of a dilute aqueous solution of an alkali-metal hypochlorite under mild oxidizing conditions.

4. A process of improving an acid pasted copper phthalocyanine pigment which comprises treating said acid pasted pigment with a small amount of sodium hypochlorite in the form of an aqueous solution of not more than about 0.10 per cent concentration at a temperature above 25° C. and below 80° C.

5. A process of improving an acid pasted copper phthalocyanine pigment which comprises forming a slurry of said acid pasted pigment in 20 to 50 times its weight of water, mixing with the resulting slurry sodium hypochlorite in an amount equal to a few per cent of the weight of said pigment, and heating the mixture at a temperature of about 60° C.

6. A process of improving an acid pasted copper phthalocyanine pigment which comprises subjecting said acid pasted pigment to a mild oxidation treatment with a dilute aqueous solution of an inorganic oxidizing agent under non-acid conditions and then subjecting said pigment to a mild reduction treatment with an inorganic reducing agent.

7. A process of improving a phthalocyanine pigment which comprises subjecting an acid pasted phthalocyanine pigment to the oxidizing action of a dilute aqueous solution of an alkaline inorganic oxidizing agent under mild oxidizing conditions, and then subjecting said pigment to a reducing treatment under mild reducing conditions with an inorganic reducing agent capable of reacting with said alkaline oxidizing agent to form a water-soluble product.

8. A process of improving an acid pasted phthalocyanine pigment which comprises treating said pigment with a small amount of an alkali metal hypochlorite agent in the form of an aqueous solution of not more than about 0.10 per cent concentration under mild oxidizing conditions, and then treating said pigment with a sulfite of an alkali metal in the form of an aqueous solution of not more than about 1 per cent concentration under mild reducing conditions.

9. A process of improving an acid pasted phthalocyanine pigment which comprises treating said pigment with an aqueous solution of sodium hypochlorite of not more than about 0.10 per cent concentration in such an amount that not more than about 2 parts of sodium hypochlorite is present per 100 parts by weight of the pigment, at a temperature above 25° C. and below 80° C., and then treating the said pigment with an aqueous solution of sodium bisulfite of not more than 1 per cent concentration in such an amount that there is present 2 to 100 parts of sodium bisulfite per 100 parts by weight of pigment, at a temperature between 10° C. and 30° C.

10. A process of improving an acid pasted copper phthalocyanine pigment which comprises treating said pigment with a small amount of sodium hypochlorite in the form of an aqueous solution of not more than about 0.10 per cent concentration at a temperature above 25° C. and below 80° C. and then treating said pigment with at least 15 parts of an aqueous sodium bisulfite solution of not more than about 1 per cent concentration at a temperature between 10° C. and 30° C.

MAURICE H. FLEYSHER.
JAMES OGILVIE.